United States Patent
Chalfant et al.

(10) Patent No.: US 11,138,055 B1
(45) Date of Patent: Oct. 5, 2021

(54) SYSTEM AND METHOD FOR TRACKING MEMORY CORRECTED ERRORS BY FREQUENCY OF OCCURRENCE WHILE REDUCING DYNAMIC MEMORY ALLOCATION

(71) Applicant: DELL PRODUCTS, LP, Round Rock, TX (US)

(72) Inventors: David K. Chalfant, Round Rock, TX (US); Jordan Chin, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/918,621

(22) Filed: Jul. 1, 2020

(51) Int. Cl.
| | |
|---|---|
| *G06F 11/00* | (2006.01) |
| *G06F 11/07* | (2006.01) |
| *G06F 9/50* | (2006.01) |
| *G06F 11/30* | (2006.01) |
| *G06F 11/10* | (2006.01) |

(52) U.S. Cl.
CPC ........ *G06F 11/0772* (2013.01); *G06F 9/5016* (2013.01); *G06F 11/076* (2013.01); *G06F 11/1068* (2013.01); *G06F 11/3037* (2013.01)

(58) Field of Classification Search
CPC ............. G06F 11/0772; G06F 11/3037; G06F 11/076; G06F 11/1068
See application file for complete search history.

(56) References Cited

U.S. PATENT DOCUMENTS

| | | | |
|---|---|---|---|
| 7,315,961 B2* | 1/2008 | Ramirez | ............. G06F 11/0721 714/15 |
| 9,606,889 B1 | 3/2017 | Herzi et al. | |
| 10,318,455 B2 | 6/2019 | Chalfant et al. | |
| 10,395,750 B2 | 8/2019 | Berke et al. | |
| 10,515,682 B2 | 12/2019 | Koladi et al. | |
| 2014/0281805 A1* | 9/2014 | Sah | ........................ G11C 29/42 714/764 |
| 2017/0228177 A1* | 8/2017 | Kodama | ................... G06F 3/06 |
| 2019/0026239 A1* | 1/2019 | Chalfant | ............. G06F 11/0772 |
| 2020/0133517 A1 | 4/2020 | Shah et al. | |

* cited by examiner

*Primary Examiner* — Charles Ehne
(74) *Attorney, Agent, or Firm* — Larson Newman, LLP (57) ABSTRACT

An information handling system includes a processor and a basic input/output system (BIOS). The processor executes an operating system, and detects a corrected error from a memory controller of the information handling system. In response, the processor generates a system management interrupt (SMI). In response to the SMI the BIOS executes a SMI handler. The SMI handler detects a row of the corrected error within a dual inline memory module (DIMM) of the information handling system, and determines whether an entry for the row is located within a hash table. In response to the entry for the row being located within the hash table, the SMI handler increments an error count in a field of the entry for the row. Otherwise, the SMI handler adds a new entry for the row to the hash table, and increments an error count in a field of the new entry for the row.

20 Claims, 5 Drawing Sheets

SYSTEM AND METHOD FOR TRACKING MEMORY CORRECTED ERRORS BY FREQUENCY OF OCCURRENCE WHILE REDUCING DYNAMIC MEMORY ALLOCATION

FIELD OF THE DISCLOSURE

The present disclosure generally relates to information handling systems, and more particularly relates to tracking memory corrected errors by frequency of occurrence while reducing dynamic memory allocation.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a processor and a basic input/output system (BIOS). The processor may execute an operating system of the information handling system, and detect a corrected error from a memory controller of the information handling system. In response, the processor may generate a system management interrupt (SMI). The BIOS may receive the SMI from the processor. In response, the BIOS may execute a SMI handler. The SMI handler may detect a row of the corrected error within a dual inline memory module (DIMM) of the information handling system. The SMI handler may determine whether an entry for the row is located within a hash table. In response to the entry for the row being located within the hash table, the SMI handler may increment an error count in a field of the entry for the row. In response to the entry for the row not being located within the hash table, the SMI handler may add a new entry for the row to the hash table, and increment an error count in a field of the new entry for the row.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
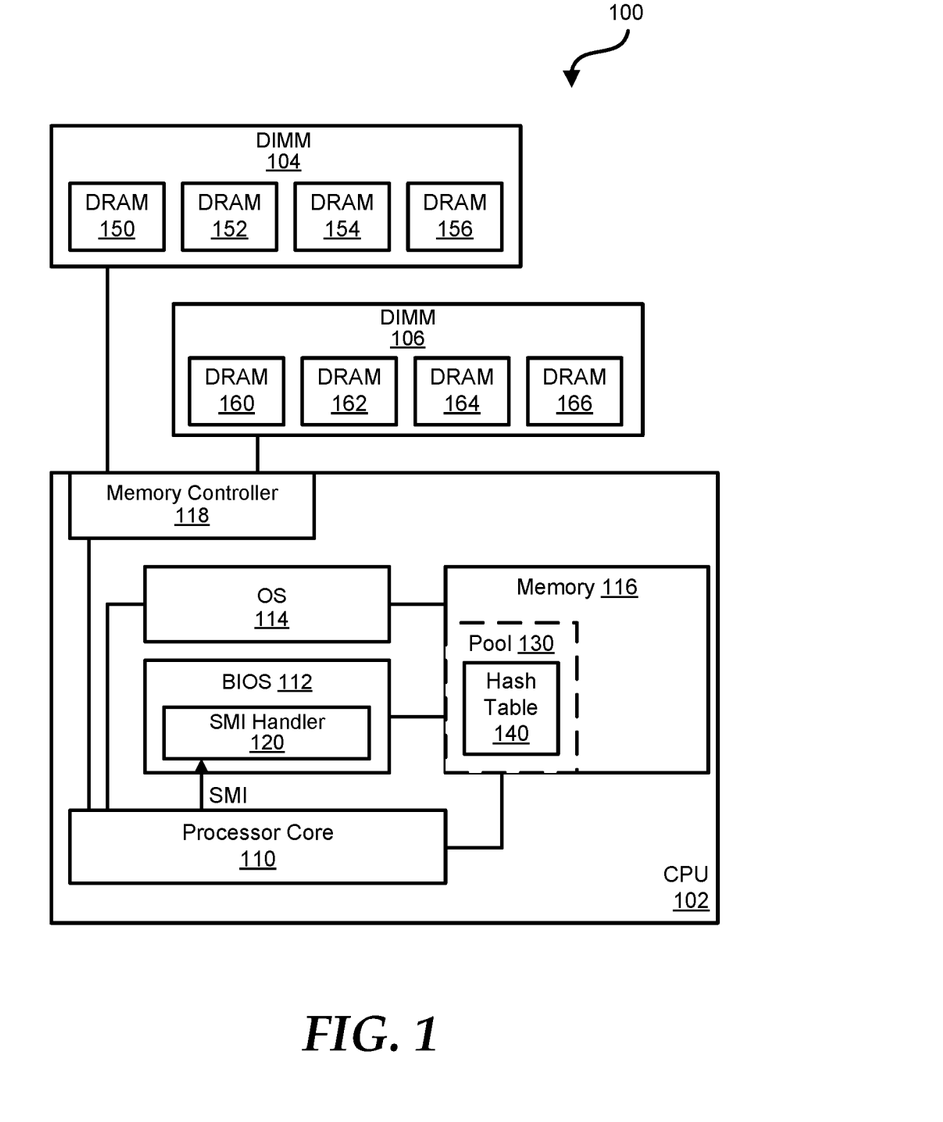
FIG. 1 is block diagram of a portion of an information handling system according to at least one embodiment of the disclosure.

FIG. 1 shows an information handling system 100 including central processing unit (CPU) 102. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 includes CPU 102 and dual in-line memory modules (DIMMs) 104 and 106. In an example, the information handling system 100 can be a server, a personal computer, a laptop computer, or the like. CPU 102 includes a processor core 110, a basic input/output system (BIOS) 112, an operating system (OS) 114, a memory 116, and a memory controller 118. BIOS 112 includes a system management interrupt (SMI) handler 120, which in turn may be a firmware process executed by CPU 102. In an example, processor 110 may perform one or more operations via OS 114. DIMM 104 includes multiple dynamic random access memories (DRAMs) including, but not limited to, DRAMs 150, 152, 154, and 156 (150-156). DIMM 106 includes multiple DRAMs including, but not limited to, DRAMs 160, 162, 164, and 166 (160-166). In an embodiment, DIMMs 104 and 106 can be assigned with processor core 110. In an example, information handling system 100 and CPU 102 may each include additional components without varying from the scope of this disclosure. For example, CPU 102 may be a multicore CPU, such that the CPU may include more processor cores than just processor core 110. In this example, each processor core may have one or more DIMMs assigned to the processor core. However, for brevity and clarity the description of FIG. 1 will be described with respect to processor core 110 and DIMMs 104 and 106.

Processor core 110 can operate to provide data and control interfaces to one or more DIMMs, such as DIMMs 104 and 106 in accordance with a particular memory architecture. For example, processor core 110 and the off-package DIMMs 104 and 106 may operate in accordance with a Double-Data Rate (DDR) standard, such as a JEDEC DDR4 or DDR5 standard. Memory 116 may be any suitable type of memory including, but not limited to, a system management random access memory (SMRAM) located internally on the processor package itself. In an example, SMRAM may include dedicated code, such as SMI handling code, and data defined a build time. In this example, the SMI handling code may enable CPU 102 to appropriately respond to each individual SMI source. Memory 116 may also include a pool of memory, such as pool 130, which may be dynamically allocated to one or more processor cores, such as processor core 110, at runtime. For example, pool 130 may be dynamically allocated and shared between each processor core of CPU 102.

In an example, a processor thread executing O/S code may issue a memory read request to system memory. Processor core 110 or data fabric logic may translate and route the memory read request to a specific memory controller, such as memory controller 118. Memory controller 108 may then route the memory read request to a downstream DIMM module, such as DIMM 104 or 106. When the memory read data is retrieved, memory controller 108 may detect one ore more error correction code (ECC) within the data packet. Memory controller 108 may then report a corrected Machine Check Exception (MCE) to CPU package 100. Processor core 110 or data fabric logic may detect the MCE and signal a System Management Interrupt (SMI) to all of the processor threads executing with CPU package 102. The system may suspend O/S code execution and transition to execute the SMI handler code on a Boot Strap processor. SMI handler 120 may detect the source of the error, identify the affected DIMM, such as DIMM 104 or 106, and may take additional handling actions before exiting. The system may then transition back to executing O/S code on all processor threads and the O/S now has the capability to report the error to the computer user.

In an example, SMI handler 120 can determine that the SMI came from the processor core 110 and can determine a region of the off-package DIMM 104 or 106 that generated the SMI. For example, SMI handler 120 may determine a particular memory address within a particular row in a bank of DIMM 104 or 106 associated with the CECC error. SMI handler 120 may then write any suitable data within a hash table 140 stored in pool 130 of memory 116. In an example, the data within hash table 140 may identify the row associated with the CECC error, an error count number for the row, and an error record for the CECC error. In certain examples, SMI handler may be a previously registered SMI handler within BIOS 112 of information handling system 100.

In previous information handling systems, a SMI handler of an UEFI BIOS firmware may utilize one or more suitable operations to determine whether corrective actions were needed for the DIMM associated with the error. For example, a SMI handler would count the number of CECC errors received by processor core 110, and record or flag the most recent error location at the time the BIOS firmware reaches an error count threshold. In an example, a previous information handling system may utilize the SMI handler implement a corrective action or customer notification in response to the error count threshold being exceeded.

For example, an error count threshold may be six, and the CECC errors received from a particular DIMM may be as follows: error at row 0; error at row 0; error at row 0; error at row 0; error at row 0; and error at row 5. In the previous information handling system, the SMI handler would flag the error at row 5 for the corrective action based on this error causing the error count threshold to be exceeded. In this example, the SMI handler in a previous information handling system would perform fault avoidance operations on row 5 of the DIMM. However, in the list of exemplary errors provided above row 0 of the DIMM was associated with the most errors generated by the DIMM. Thus, the previous approach would utilize limited resources for fault avoidance operations, such as page retirement, post-package repair (PPR), advanced memory reliability features, or the like, on row 5. However, performing the fault avoidance operations on row 5 would not effectively reduce the overall number of CECC errors generated by the DIMM because row 0 was clearly associated with the most overall number of CECC errors.

Information handling system 100 is improved herein by SMI handler 120 of the UEFI BIOS firmware utilizing a predictive failure algorithm (PFA) to respond the CECC errors. In this improvement, SMI handler 120 may efficiently track and compactly store unique memory rows of DIMM 104 or 106 that are most frequently impacted by errors. For example, SMI handler 120 may utilize hash table 140 to track and record the number of CECC errors associated with each row of a DIMM and to record a most recent error record for that row. As will be described in greater detail below, SMI handler 120 may execute the fault avoidance operations on the row associated with the most errors when the error count threshold is exceeded. The improvements to information handling system 100 include, but are not limited to, reducing an amount of memory 116 dynamically allocated to processor core 110 via pool 130, reduction of SMI time, and improved allocation of fault avoidance resources. In an example, the fault avoidance resources may prevent service calls for information handling system 100, and/or warranty replacement operations on DIMMs 104 and 106. Additionally, SMI handler 120 may notify a user of information handling system 100 of impending failures in DIMM 104 or 106 via any suitable component, such as display device 532 of FIG. 5.

During operation of information handling system 100, processor core 110 may perform one or more operations of OS 114, which may include writing data to or reading data from DIMM 104 or 106. While processor core 110 is performing operations of OS 114, memory controller 118 may detect a corrected error for DIMM 104 or 106. In an example, the corrected error may be any suitable type of corrected error including, but not limited to, a CECC error. Memory controller 118 may provide the corrected error to processor core 110, which in turn may generate a system management interrupt (SMI). In an example, processor core 110 may provide the SMI to BIOS 112. In response to the reception of the SMI, SMI handler 120 may perform one or more suitable operations to identify a memory address associated with the corrected error, and to determine whether fault avoidance operations should be performed. In an example, SMI handler 120 may perform the operations by any suitable means including, but not limited to, executing a fault prediction algorithm (FPA) to dynamically build hash table 140 based on a linked list implementation. In certain examples, the linked list implementation may be utilized to correlate unique memory row locations within DIMMs 104 and 106 to the number of corrected errors impacting those locations.

In an example, SMI handler 120 may generate an error record for the newly detected corrected error. In an embodiment, the error record may include any suitable data in any suitable format including, but not limited to, a basic input/output system (BIOS) Common Platform Error Record (CPER). SMI handler 120 may then determine whether leaky bucket time limit has expired. In an example, a leaky bucket may be performed by any suitable device to count a number of detected corrected errors that occur within a particular time period. For example, SMI handler 120 of BIOS 112 may perform one or more operations, such as execute an algorithm, to track detected corrected errors within a particular decay rate. In an example, the decay rate may be any suitable amount of time including, but not limited to, 50 hours, 75 hours, 100 hours, 110 hours, and 120 hours. If the leaky bucket time limit has expired, an error count in the leaky bucket is cleared and hash table 140 is also cleared. For example, the entries within hash table 140 may be removed from the linked list, which in turn may free all dynamically allocated memory of memory 116 that was associated with the error records within hash table 140. In an example, the clearing of hash table 140 may avoid memory leaks within memory 116. However, if the leaky bucket time limited has not expired, SMI handler 120 may increment the error count in the leaky bucket. In an example, the leaky bucket tracking of detected corrected errors may be performed on a DIMM basis, such that a separate leaky bucket error count is tracked for each DIMM 104 and 106 in information handling system 100.

Additionally, if the leaky bucket time limit has not expired, SMI handler 120 may compare the newly detected corrected error to each existing entry in hash table 140. Based on the comparison, SMI handler 120 may determine whether an entry for the row of DIMM 104 or 106 associated with the detected error is located in hash table 140. In an example, hash table 140 may include a different entry for each row of a particular DIMM 104 or 106 that has at least one detected corrected error. In certain examples, the entry in hash table 140 for a row of DIMM 104 or 106 may include an error count and a most recent error record for that particular row.

In an example, if SMI handler 120 determines an entry for the row of the memory address with the corrected error already exists in hash table 140, the SMI handler may update the error count in the entry and update the error record within the entry. In an example, the updating of the error record data for the row with a detected corrected error results in only the most recent error record of a particular row being stored in hash table 140, which in turn reduces an amount of memory 116 utilized by the hash table. Additionally, SMI handler 120 may also store the most recent machine check data for the corrected error in the entry to further reduce memory utilized by hash table 140. In an example, the machine check data may be utilized when reliability, availability and serviceability (RAS) corrective actions are dispatched. The RAS corrective actions may be any suitable actions as defined by or associated with the chipset of CPU 102. The reduction of memory used by hash table 140 may improve information handling system 100 by providing more of memory 116 to other components of the information handling system. If SMI handler 120 determines no existing entry in hash table 140 matches the row with the corrected error in DIMM 104 or 106, the SMI handler may add a new entry the hash table.

In an example, SMI handler 120 may determine whether an PFA error threshold has been exceeded. In certain examples, the error threshold may be any suitable number of detected corrected errors including, but not limited to, any number between 1 and 1,000. If the error threshold has not been exceeded, SMI handler 120 may exit the SMI and processor core 110 may resume operations of OS 114. However, if SMI handler 120 determines that the error threshold has been exceeded, the SMI handler may analyze the current hash table 140 to determine an entry within the highest error count of corrected errors. SMI handler 120 may utilize the data within the entry to determine pointer to UEFI CPER and associated processor machine check data structures.

In an example, SMI handler 120 may use this data to dispatch the most effective RAS corrective action. For example, SMI handler 120 may perform fault avoidance on a row with the maximum error count. In an example, the fault avoidance may be any suitable operation including, but not limited to, page retirement, Post-Package Repair (PPR), and advanced memory reliability features. SMI handler 120 may also provide a notification to a user of information handling system 100 about impending failures in DIMM 104 or 106. After performing the corrective actions, SMI handler 120 may clear hash table 140 and free all dynamically allocated memory of memory 116. These operations by SMI handler 120 may avoid the possibility of memory leak errors during runtime of information handling system 100.

In an example, further improvements may be made to information handling system 100 by SMI handler 120 determining whether a predetermined number of corrected errors have been detected prior to comparing the row within existing entries in hash table 140. In certain examples, the determination of whether the predetermined number of corrected errors has been detected may be performed in any suitable manner including, but not limited to, SMI handler 120 determining whether an error count modulo of the predetermined number equals zero. For example, if the predetermined number is one, then a sampling rate of the corrected errors is 100%. In certain examples, as the predetermined number increases the sampling rate is decreased. In an example, the reduction of the sampling rate may improve information handling system 100 by reducing performance impacts due to SMI latencies within SMI handler 120 as compared to previous information handling systems.

In an example, further improvements may be made to information handling system 100 by SMI handler 120 one or more additional operations if the predetermined number of corrected errors has been detected. For example, if the predetermined number of corrected errors has been detected, SMI handler 120 may re-sort the entries in hash table 140 by error count. In an example, SMI handler 120 may utilize the predetermined number of corrected errors for any suitable purpose including, but not limited to, determining when to re-sort entries in hash table 140. For example, if the predetermined number is one, then the error count modulo of the predetermined number always equals zero and SMI handler 120 may re-sort the entries in hash table 140 on every detected corrected error. In certain examples, as the predetermined number increases, the entries in hash table 140 are re-sorted less often. In an example, the re-sorting of the entries by error count may ensure SMI handler 120 compares the row associated with the newly detected corrected error to the entry with the highest error count first. Thus, the re-sorting of the entries may improve information handling system 100 by reducing an amount of time spent in system management mode (SMM) based on the assumption that new future errors may be likely to be a repeat of the memory address of a row with already the highest error count. Therefore, the re-sorting may avoid unnecessary linked list traversal through the entries of the hash table.

Figure 2:
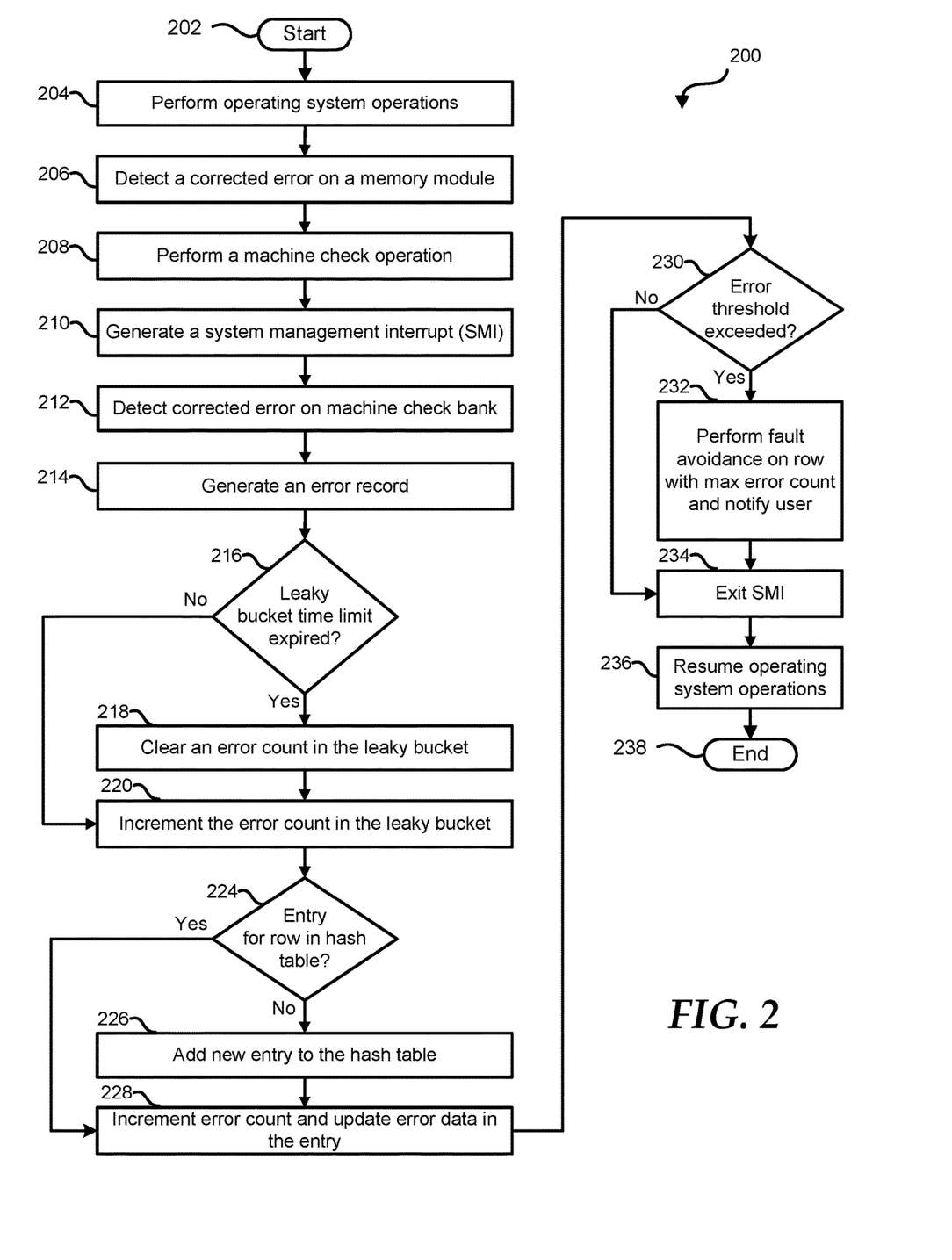
FIG. 2 is a flow diagram of a method for tracking memory corrected errors by frequency of occurrence and performing fault avoidance while reducing dynamic memory allocation according to at least one embodiment of the present disclosure.

FIG. 2 illustrates a flow diagram of a method 200 for tracking memory corrected errors by frequency of occurrence and performing fault avoidance while reducing dynamic memory allocation according to at least one embodiment of the disclosure, starting at block 202. It will be readily appreciated that not every method step set forth in this flow diagram is always necessary, and that certain steps of the methods may be combined, performed simultaneously, in a different order, or perhaps omitted, without varying from the scope of the disclosure. FIG. 2 may be employed in whole, or in part, by information handling system 100 depicted in FIG. 1, information handling system 500 described in FIG. 5, or any other type of system, controller, device, module, processor, or any combination thereof, operable to employ all, or portions of, the method of FIG. 2.

At block 204, operating system (O/S) operations are performed. In an example, a processor core of an information handling system may perform the O/S operations. At block 206, a corrected error is detected. In an example, the corrected error may be any suitable type of corrected error including, but not limited to, a corrected error correction code (ECC) error. At block 208, a machine check operation is performed. At block 210, a system management interrupt (SMI) is generated. In an example, the SMI may be generated in any suitable device including, but not limited to, a hardware processor. At block 212, the corrected ECC error is detected on a machine check bank.

At block 214, an error record is generated. In an example, the error record may include any suitable data in any suitable format including, but not limited to, a basic input/output system (BIOS) Common Platform Error Record (CPER). At block 216, a determination is made whether leaky bucket time limit has expired. In an example, a leaky bucket may be performed by any suitable device to count a number of detected corrected errors that occur within a particular time period. For example, a BIOS of the information handling system may perform one or more operations, such as execute an algorithm, to track detected corrected errors within a particular decay rate. In an example, the decay rate may be any suitable amount of time including, but not limited to, 50 hours, 75 hours, 100 hours, 110 hours, and 120 hours. If the leaky bucket time limit has expired, an error count in the leaky bucket is cleared at block 218, and the error count is incremented at block 220. However, if at block 216 the leaky bucket time limited has not expired, the error count in the leaky bucket is incremented at block 220 without first clearing the error count. In an example, the leaky bucket tracking of detected corrected errors may be performed on a DIMM basis, such that a separate leaky bucket error count is tracked for each DIMM in the information handling system.

At block 224, a determination is made whether an entry for the row of the DIMM with the detected error is located in a hash table. In an example, the hash table may include a different entry for each row of a particular DIMM that has at least one detected corrected error. In certain examples, the entry in the hash table for a row of the DIMM may include an error count and a most recent error record for that particular row. If an entry for the row of the DIMM is not located in the hash table, a new entry is added to the hash table at block 226 and the flow continues at block 228. If an entry for the row of the DIMM is located in the hash table, an error count in the entry is incremented and error record data for the row of the DIMM is updated in the entry of the hash table associated with the row at block 228. In an example, the updating of the error record data for the row with a detected corrected error results in only the most recent error record of a particular row being stored in the hash table, which in turn reduces an amount of memory utilized by the hash table. The reduction of memory used by the hash table may improve the information handling system by providing more of the memory to other components of the information handling system.

At block 230, a determination is made whether an error threshold has been exceeded. In an example, the error threshold may be any suitable number of detected corrected errors including, but not limited to, any number between 1 and 1,000. If the error threshold has not been exceeded, the flow continues at block 234. However, if the error threshold has been exceeded, fault avoidance is performed on a row with the maximum error count and a notification is sent to a user of the information handling system at block 232. In an example, the fault avoidance may be any suitable operation including, but not limited to, RAS capabilities, page retirement, self-healing, and Post-Package Repair (PPR). At block 234, the SMI is exited. At block 236, O/S operations are resumed, and the flow ends at block 238.

Figure 3:
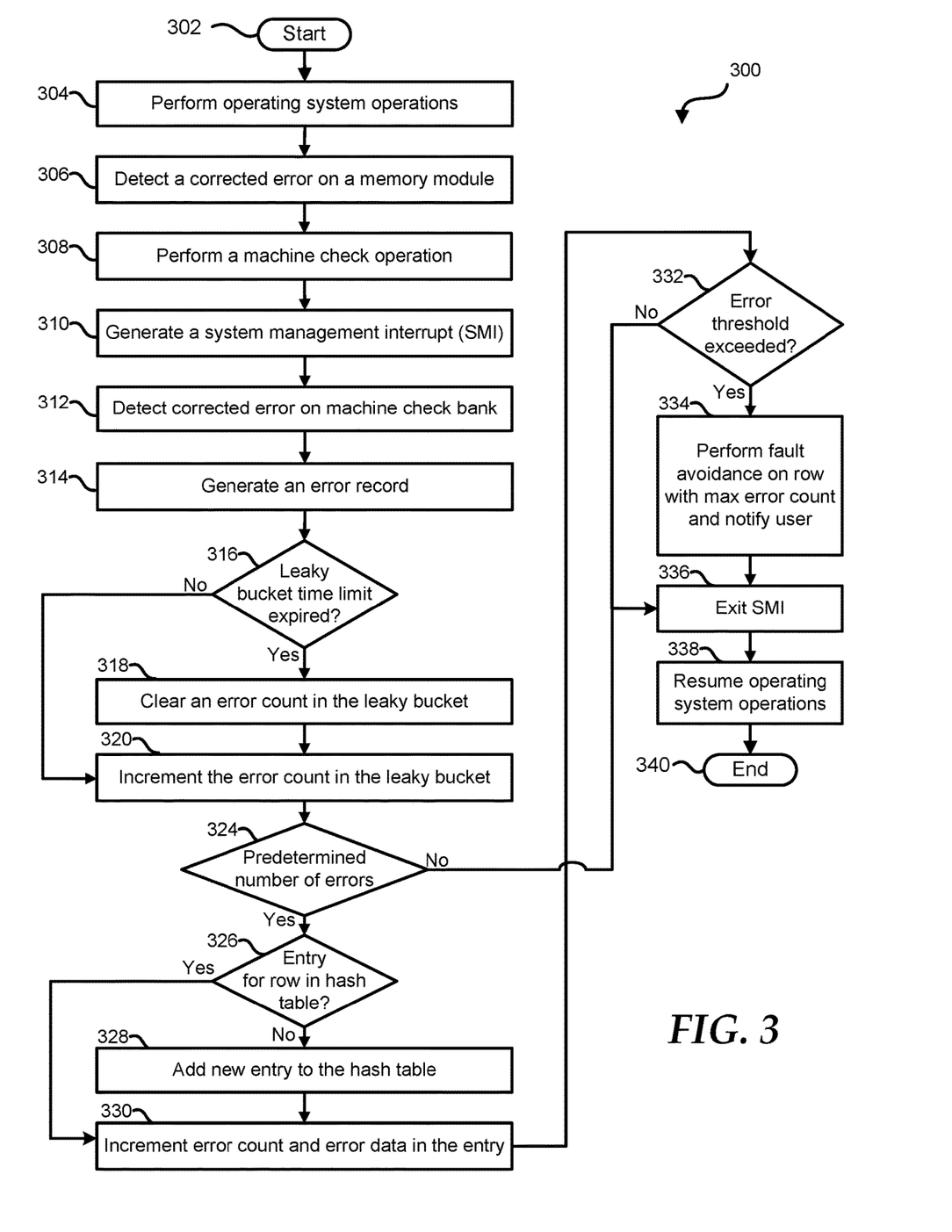
FIG. 3 is a flow diagram of a method for tracking memory corrected errors by frequency of occurrence and performing fault avoidance while reducing dynamic memory allocation according to at least one embodiment of the present disclosure.

FIG. 3 is a flow diagram of another method for tracking memory corrected errors by frequency of occurrence and performing fault avoidance while reducing dynamic memory allocation according to at least one embodiment of the present disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, by information handling system 100 depicted in FIG. 1, information handling system 500 described in FIG. 5, or any other type of system, controller, device, module, processor, or any combination thereof, operable to employ all, or portions of, the method of FIG. 3.

At block 304, O/S operations are performed. In an example, a processor core of an information handling system may perform the O/S operations. At block 306, a corrected error is detected. In an example, the corrected error may be any suitable type of corrected error including, but not limited to, a corrected ECC error. At block 308, a machine check operation is performed. At block 310, a SMI is generated. In an example, the SMI may be generated in any suitable device including, but not limited to, a hardware processor. At block 312, the corrected ECC error is detected on a machine check bank.

At block 314, an error record is generated. At block 316, a determination is made whether leaky bucket time limit has expired. If the leaky bucket time limit has expired, an error count in the leaky bucket is cleared at block 318, and the error count is incremented at block 320. However, if at block 316 the leaky bucket time limited has not expired, the error count in the leaky bucket is incremented at block 320 without first clearing the error count. In an example, the leaky bucket tracking of detected corrected errors may be performed on a DIMM basis, such that a separate leaky bucket error count is tracked for each DIMM in the information handling system.

At block 324, a determination is made whether a predetermined number of corrected errors have been detected. In an example, the determination of whether the predetermined number of corrected errors has been detected may be performed in any suitable manner including, but not limited to, determining whether an error count modulo of the predetermined number equals zero. For example, if the predetermined number is one, then a sampling rate of the corrected errors is 100%. In certain examples, as the predetermined number increases the sampling rate is decreased. In an example, the reduction of the sampling rate may improve the information handling system by reducing performance impacts due to SMI latencies.

If the predetermined number of corrected errors has not been detected, the flow continues at block 336. However, if the predetermined number of corrected errors has been detected, a determination is made whether an entry for the row of the DIMM with the detected error is located in a hash table at block 326. In an example, the entry in the hash table for a row of the DIMM may include an error count and a most recent error record for that particular row. If an entry for the row of the DIMM is not located in the hash table, a new entry is added to the hash table at block 328 and the flow continues at block 330. If an entry for the row of the DIMM is located in the hash table, an error count in the entry is incremented and error record data for the row of the DIMM is updated in the entry of the hash table associated with the row at block 330. In an example, the updating of the error record data for the row with a detected corrected error results in only the most recent error record of a particular row being stored in the hash table.

At block 332, a determination is made whether an error threshold has been exceeded. In an example, the error threshold may be any suitable number of detected corrected errors including, but not limited to, any number between 1 and 1,000. If the error threshold has not been exceeded, the flow continues at block 336. However, if the error threshold has been exceeded, fault avoidance is performed on a row with the maximum error count and a notification is sent to a user of the information handling system at block 334. At block 336, the SMI is exited. At block 338, OS operations are resumed, and the flow ends at block 340.

Figure 4:
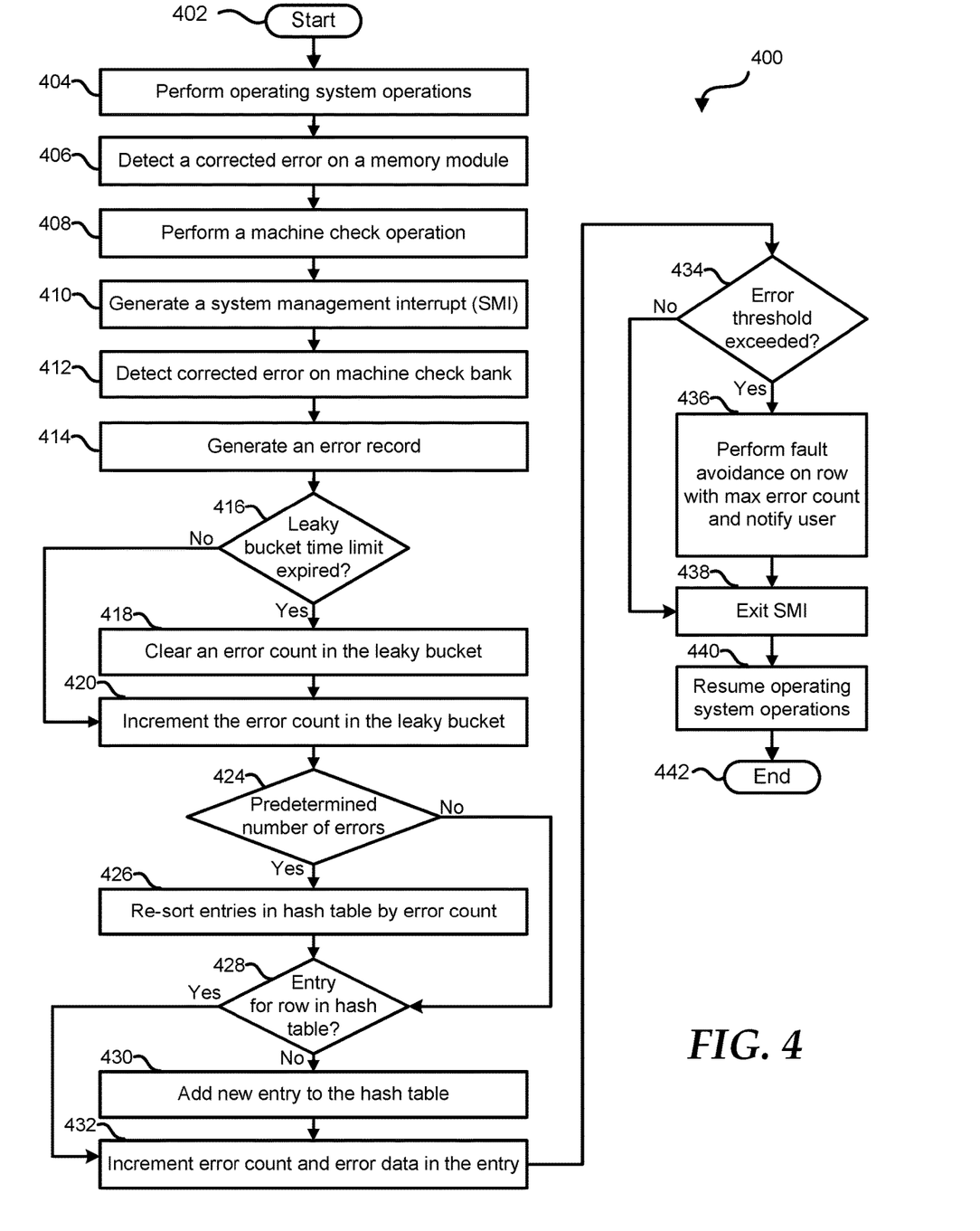
FIG. 4 is a flow diagram of a method for tracking memory corrected errors by frequency of occurrence and performing fault avoidance while reducing dynamic memory allocation according to at least one embodiment of the present disclosure.

FIG. 4 is a flow diagram of another method for tracking memory corrected errors by frequency of occurrence and performing fault avoidance while reducing dynamic memory allocation according to at least one embodiment of the present disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 100 depicted in FIG. 1, information handling system 500 described in FIG. 5, or any other type of system, controller, device, module, processor, or any combination thereof, operable to employ all, or portions of, the method of FIG. 4.

At block 404, O/S operations are performed. In an example, a processor core of an information handling system may perform the O/S operations. At block 406, a corrected error is detected. In an example, the corrected error may be any suitable type of corrected error including, but not limited to, a corrected ECC error. At block 408, a machine check operation is performed. At block 410, a SMI is generated. In an example, the SMI may be generated in any suitable device including, but not limited to, a hardware processor. At block 412, the corrected ECC error is detected on a machine check bank.

At block 414, an error record is generated. At block 416, a determination is made whether leaky bucket time limit has expired. If the leaky bucket time limit has expired, an error count in the leaky bucket is cleared at block 418, and the error count is incremented at block 420. However, if at block 416 the leaky bucket time limited has not expired, the error count in the leaky bucket is incremented at block 420 without first clearing the error count. In an example, the leaky bucket tracking of detected corrected errors may be performed on a DIMM basis, such that a separate leaky bucket error count is tracked for each DIMM in the information handling system.

At block 424, a determination is made whether a predetermined number of corrected errors have been detected. In an example, the determination of whether the predetermined number of corrected errors has been detected may be performed in any suitable manner including, but not limited to, determining whether an error count modulo of the predetermined number equals zero. If the predetermined number of corrected errors has not been detected, the flow continues at block 428. However, if the predetermined number of corrected errors has been detected, the entries in the hash table are re-sorted by error count at block 426. In an example, the predetermined number may be utilized for any suitable purpose including, but not limited to determining when to re-sort entries in the hash table. For example, if the predetermined number is one, then the error count modulo of the predetermined number always equals zero and the entries in the hash table are re-sort on every detected corrected error. In certain examples, as the predetermined number increases the entries in the hash table are re-sorted less often. In an example, the re-sorting of the entries by error count may ensure the entry with the highest error count is compared first. Thus, the re-sorting of the entries may improve the information handling system by reducing an amount of time spent in system management mode (SMM) based on the assumption that new future errors may be likely to be a repeat of the memory address of a row with already the highest error count. Therefore, the re-sorting may avoid unnecessary linked list traversal through the entries of the hash table.

At block 428, a determination is made whether an entry for the row of the DIMM with the detected error is located in a hash table. In an example, the entry in the hash table for a row of the DIMM may include an error count and a most recent error record for that particular row. If an entry for the row of the DIMM is not located in the hash table, a new entry is added to the hash table at block 430 and the flow continues at block 432. If an entry for the row of the DIMM is located in the hash table, an error count in the entry is incremented and error record data for the row of the DIMM is updated in the entry of the hash table associated with the row at block 432. In an example, the updating of the error record data for the row with a detected corrected error results in only the most recent error record of a particular row being stored in the hash table.

At block 434, a determination is made whether an error threshold has been exceeded. In an example, the error threshold may be any suitable number of detected corrected errors including, but not limited to, any number between 1 and 1,000. If the error threshold has not been exceeded, the flow continues at block 438. However, if the error threshold has been exceeded, fault avoidance is performed on a row with the maximum error count and a notification is sent to a user of the information handling system at block 436. At block 438, the SMI is exited. At block 440, O/S operations are resumed, and the flow ends at block 442.

Figure 5:
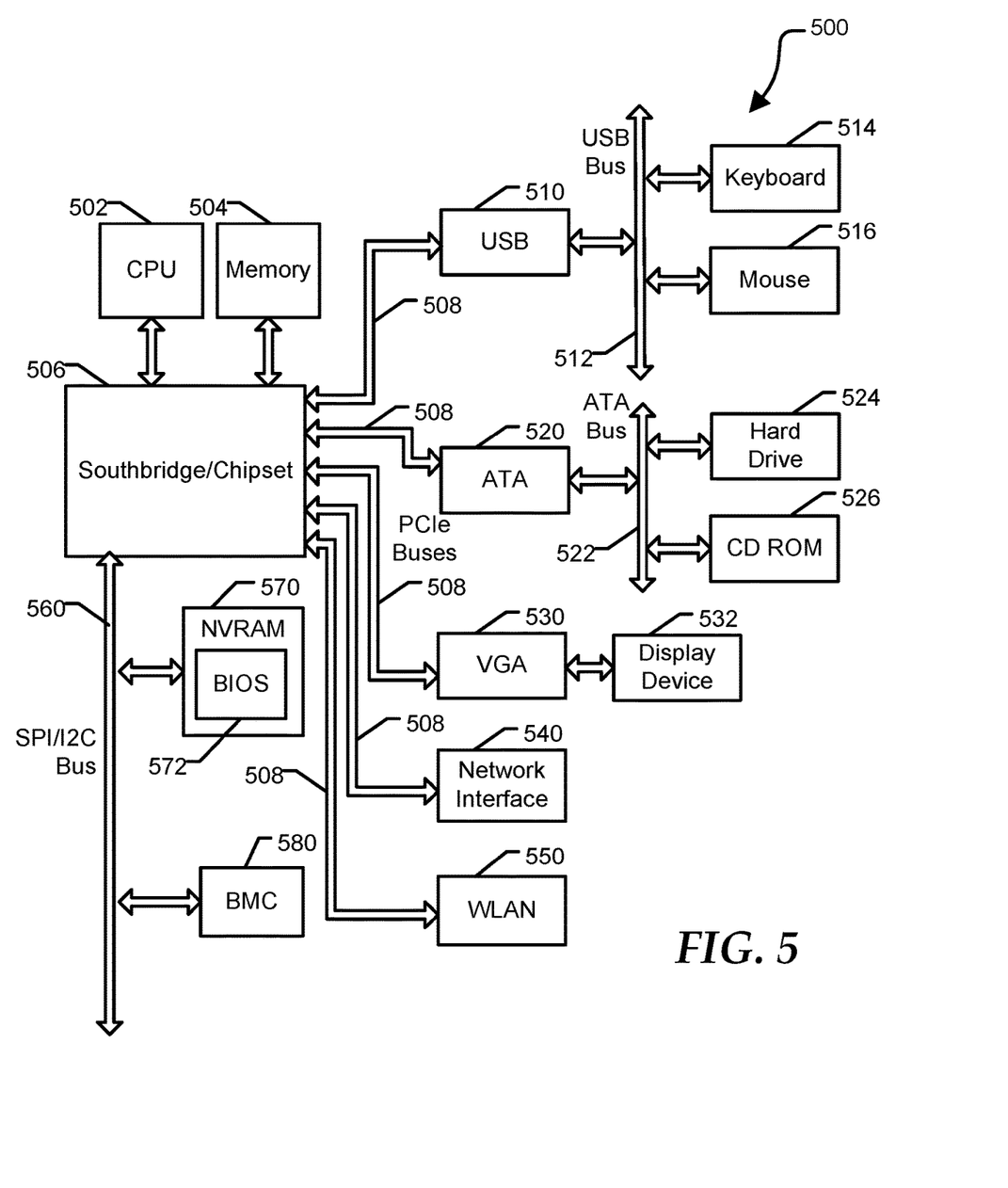
FIG. 5 is a block diagram of a general information handling system according to an embodiment of the present disclosure.

FIG. 5 illustrates a general information handling system 500 including a processor 502, a memory 504, a southbridge/chipset 506, one or more PCIe buses 508, a universal serial bus (USB) controller 510, a USB 512, a keyboard device controller 514, a mouse device controller 516, a configuration an ATA bus controller 520, an ATA bus 522, a hard drive device controller 524, a compact disk read only memory (CD ROM) device controller 526, a video graphics array (VGA) device controller 530, a network interface controller (NIC) 540, a wireless local area network (WLAN) controller 550, a serial peripheral interface (SPI) bus 560, a NVRAM 570 for storing BIOS 572, and a baseboard management controller (BMC) 580. In an example, chipset 506 may be directly connected to an individual end point via a PCIe root port within the chipset and a point-to-point topology as shown in FIG. 5. BMC 580 can be referred to as a service processor or embedded controller (EC). Capabilities and functions provided by BMC 580 can vary considerably based on the type of information handling system. For example, the term baseboard management system is often used to describe an embedded processor included at a server, while an embedded controller is more likely to be found in a consumer-level device. As disclosed herein, BMC 580 represents a processing device different from CPU 502, which provides various management functions for information handling system 500. For example, an embedded controller may be responsible for power management, cooling management, and the like. An embedded controller included at a data storage system can be referred to as a storage enclosure processor.

System 500 can include additional processors that are configured to provide localized or specific control functions, such as a battery management controller. Bus 560 can include one or more busses, including a SPI bus, an I2C bus, a system management bus (SMBUS), a power management bus (PMBUS), and the like. BMC 580 can be configured to provide out-of-band access to devices at information handling system 500. As used herein, out-of-band access herein refers to operations performed prior to execution of BIOS 572 by processor 502 to initialize operation of system 500.

BIOS 572 can be referred to as a firmware image, and the term BIOS is herein used interchangeably with the term firmware image, or simply firmware. BIOS 572 includes instructions executable by CPU 502 to initialize and test the hardware components of system 500, and to load a boot loader or an operating system (OS) from a mass storage device. BIOS 572 additionally provides an abstraction layer for the hardware, such as a consistent way for application programs and operating systems to interact with the keyboard, display, and other input/output devices. When power is first applied to information handling system 500, the system begins a sequence of initialization procedures. During the initialization sequence, also referred to as a boot sequence, components of system 500 are configured and enabled for operation, and device drivers can be installed. Device drivers provide an interface through which other components of the system 500 can communicate with a corresponding device.

Information handling system 500 can include additional components and additional busses, not shown for clarity. For example, system 500 can include multiple processor cores, audio devices, and the like. While a particular arrangement of bus technologies and interconnections is illustrated for the purpose of example, one of skill will appreciate that the techniques disclosed herein are applicable to other system architectures. System 500 can include multiple CPUs and redundant bus controllers. One or more components can be integrated together. For example, portions of southbridge/chipset 506 can be integrated within CPU 502. Additional components of information handling system 500 can include one or more storage devices that can store machine-executable code, one or more communications ports for communicating with external devices, and various input and output (I/O) devices, such as a keyboard, a mouse, and a video display. An example of information handling system 500 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 500 can include a set of instructions that can be executed to cause the information handling system to perform any one or more of the methods or computer based functions disclosed herein. The information handling system 500 may operate as a standalone device or may be connected to other computer systems or peripheral devices, such as by a network.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single information handling system 500 is illustrated, the term "system" shall also be taken to include any collection of systems or sub-systems that individually or jointly execute a set, or multiple sets, of instructions to perform one or more computer functions.

The information handling system 500 can include a disk drive unit and may include a computer-readable medium, not shown in FIG. 5, in which one or more sets of instructions, such as software, can be embedded. Further, the instructions may embody one or more of the methods or logic as described herein. In a particular embodiment, the instructions may reside completely, or at least partially, within system memory 504 or another memory included at system 500, and/or within the processor 502 during execution by the information handling system 500. The system memory 504 and the processor 502 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a processor to execute an operating system of the information handling system, to detect a corrected error from a memory controller of the information handling system, and to generate a system management interrupt (SMI); and
   a basic input/output system (BIOS) to receive the SMI from the processor, and in response to receiving the SMI, to execute an SMI handler, the SMI handler to:
      detect a row of the corrected error within a dual inline memory module (DIMM) of the information handling system;
      determine whether an entry for the row is located within a hash table;
      in response to the entry for the row being located within the hash table, increment an error count in a field of the entry for the row; and
      in response to the entry for the row not being located within the hash table:
         add a new entry for the row to the hash table; and
         increment an error count in a field of the new entry for the row.

2. The information handling system of claim 1, wherein the SMI handler further to:
   determine whether an error threshold has been exceeded for the DIMM; and
   if the error threshold for the DIMM has been exceeded:
      determine a row of the DIMM with a highest error count; and
      perform a fault avoidance operation on the row with the highest error count.

3. The information handling system of claim 2, wherein prior to the determination of whether the error threshold has been exceeded for the DIMM, the SMI handler further to:
   determine whether a modulo of the error count equals zero; and
   in response to the modulo of the error count equaling zero, perform the determining of whether the error threshold has been exceeded for the DIMM.

4. The information handling system of claim 2, wherein prior to the determination of whether the error threshold has been exceeded for the DIMM, the SMI handler further to:
   determine whether a modulo of the error count equals zero;
   in response to the modulo of the error count equaling zero, sort entries in the hash table with from a highest error count to a lowest error count; and
   in response to the sorting of the entries in the hash table, perform the determining of whether the error threshold has been exceeded for the DIMM.

5. The information handling system of claim 2, the SMI handler further to:
   clear the hash table; and
   deallocate all dynamically allocated memory associated with the SMI handler.

6. The information handling system of claim 1, wherein prior to the determination of whether the entry for the row is located within the hash table, the SMI handler further to:

determine whether a time limit for a leaky bucket counter for the DIMM has expired;

in response to the time limit expiring, clear an error count of the leaky bucket counter and incrementing the error count of the leaky bucket counter; and in response to the time limit not expiring, increment the error count of the leaky bucket counter.

7. The information handling system of claim 6, wherein the determination of whether the error threshold has been exceeded for the DIMM further comprises the SMI handler to compare the error count of the leaky bucket counter to the error threshold.

8. The information handling system of claim 2, wherein the fault avoidance operation is a reliability availability and serviceability (RAS) corrective action selected based on a chipset associated with the processor.

9. The information handling system of claim 2, wherein the RAS corrective action is selected from a group including: a double data rate (DDR) memory post-package repair operation on the row and an adaptive double device data correction operation on the row.

10. The information handling system of claim 1, in response to the entry for the row being located within the hash table, the SMI handler further to copy a most recent error record data for the row into the new entry for the row.

11. A method comprising:
executing, by a processor of an information handling system, an operating system;
detecting a corrected error from a memory controller of the information handling system;
generating a system management interrupt (SMI);
detecting, by an SMI handler of a basic input/output system, a row of the corrected error within a dual inline memory module (DIMM) of the information handling system;
determining, by the SMI handler, whether an entry for the row is located within a hash table;
in response to the entry for the row being located within the hash table, incrementing an error count in a field of the entry for the row; and
in response to the entry for the row not being located within the hash table:
adding a new entry for the row to the hash table; and
incrementing an error count in a field of the new entry for the row.

12. The method of claim 11, further comprising:
determining, by the SMI handler, whether an error threshold has been exceeded for the DIMM; and
if the error threshold for the DIMM has been exceeded:
determining, by the SMI handler, a row of the DIMM with a highest error count; and
performing, by the SMI handler, a fault avoidance operation on the row with the highest error count.

13. The method of claim 12, wherein prior to the determining of whether the error threshold has been exceeded for the DIMM, the method further comprising:
determining, by the SMI handler, whether a modulo of the error count equals zero; and
in response to the modulo of the error count equaling zero, performing the determining of whether the error threshold has been exceeded for the DIMM.

14. The method of claim 12, wherein prior to the determining of whether the error threshold has been exceeded for the DIMM, the method further comprising:
determining, by the SMI handler, whether a modulo of the error count equals zero;
in response to the modulo of the error count equaling zero, sorting, by the SMI handler, entries in the hash table with from a highest error count to a lowest error count; and
in response to the sorting of the entries in the hash table, performing the determining of whether the error threshold has been exceeded for the DIMM.

15. The method of claim 12, further comprising:
clearing, by the SMI handler, the hash table; and
deallocating all dynamically allocated memory associated with the SMI handler.

16. The method of claim 12, wherein prior to the determining of whether the entry for the row is located within the hash table, the method further comprising:
determining, by the SMI handler, whether a time limit for a leaky bucket counter for the DIMM has expired;
in response to the time limit expiring, clearing, by the SMI handler, an error count of the leaky bucket counter and incrementing the error count of the leaky bucket counter; and
in response to the time limit not expiring, incrementing, by the SMI handler, the error count of the leaky bucket counter.

17. The method of claim 16, wherein the determining of whether the error threshold has been exceeded for the DIMM further comprises:
comparing, by the SMI handler, the error count of the leaky bucket counter to the error threshold.

18. The method of claim 11, wherein in response to the entry for the row not being located within the hash table, the method further comprising:
copying, by the SMI handler, a most recent error record data for the row into the new entry for the row.

19. A non-transitory computer-readable medium including code that when executed by a processor causes the processor to perform a method, the method comprising:
executing an operating system;
detecting a corrected error from a memory controller of the information handling system;
generating a system management interrupt (SMI);
detecting, by an SMI handler of a basic input/output system, a row of the corrected error within a dual inline memory module (DIMM) of the information handling system;
determining whether an entry for the row is located within a hash table;
in response to the entry for the row being located within the hash table, incrementing an error count in a field of the entry for the row; and
in response to the entry for the row not being located within the hash table:
adding a new entry for the row to the hash table; and
incrementing an error count in a field of the new entry for the row.

20. The non-transitory computer-readable medium of claim 19, wherein the method further comprises:
determining, by the SMI handler, whether an error threshold has been exceeded for the DIMM; and
if the error threshold for the DIMM has been exceeded:
determining, by the SMI handler, a row of the DIMM with a highest error count; and
performing, by the SMI handler, a fault avoidance operation on the row with the highest error count.

* * * * *